(12) United States Patent
Meyer et al.

(10) Patent No.: US 8,152,916 B2
(45) Date of Patent: Apr. 10, 2012

(54) FUMED SILANIZED AND GROUND SILICA

(75) Inventors: Juergen Meyer, Stockstadt (DE);
Andreas Garbatscheck, Hainburg (DE);
Guenther Michael, Karlstein (DE);
Vlasta Valter, Grosskrotzenburg (DE)

(73) Assignee: Evonik Degussa GmbH, Essen (DE)

( * ) Notice: Subject to any disclaimer, the term of this patent is extended or adjusted under 35 U.S.C. 154(b) by 252 days.

(21) Appl. No.: 12/600,491

(22) PCT Filed: May 6, 2008

(86) PCT No.: PCT/EP2008/055572
§ 371 (c)(1),
(2), (4) Date: Nov. 17, 2009

(87) PCT Pub. No.: WO2008/141930
PCT Pub. Date: Nov. 27, 2008

(65) Prior Publication Data
US 2010/0152350 A1 Jun. 17, 2010

(30) Foreign Application Priority Data
May 22, 2007 (DE) .................. 10 2007 024 100

(51) Int. Cl.
*C04B 14/04* (2006.01)

(52) U.S. Cl. .................. 106/490; 428/405; 523/212
(58) Field of Classification Search .................. 106/490; 428/405; 523/212
See application file for complete search history.

(56) References Cited

U.S. PATENT DOCUMENTS

| | | | |
|---|---|---|---|
| 6,020,419 A * | 2/2000 | Bock et al. | 524/590 |
| 2002/0168524 A1 | 11/2002 | Kerner et al. | |
| 2005/0241531 A1* | 11/2005 | Meyer et al. | 106/490 |
| 2006/0009545 A1 | 1/2006 | Frahn et al. | |
| 2008/0139721 A1 | 6/2008 | Kerner et al. | |

FOREIGN PATENT DOCUMENTS

| | | |
|---|---|---|
| DE | 44 02 370 | 8/1995 |
| DE | 102 39 424 | 3/2004 |
| DE | 102 39 425 | 3/2004 |
| EP | 0 076 377 | 4/1983 |
| EP | 1 236 773 | 9/2002 |

* cited by examiner

*Primary Examiner* — Margaret Moore
(74) *Attorney, Agent, or Firm* — Oblon, Spivak, McClelland, Maier & Neustadt, L.L.P.

(57) ABSTRACT

The invention relates to a hydrophobic fumed silica which is obtained by grinding a fumed silica which, as a result of silanization, has octylsilyl groups fixed on the surface, to a process for preparing it, and to coating formulations comprising this silica.

21 Claims, No Drawings

FUMED SILANIZED AND GROUND SILICA

The invention relates to a hydrophobic fumed ground silica, to a process for preparing it and to its use. The present invention further relates to a coating formulation comprising the silica of the invention.

Fumed silica is known from Ullmanns Enzyklopädie der technischen Chemie, volume 21, page 464 (1982). The fumed silica is prepared by combusting an evaporable silicon compound, for example silicon tetrachloride, in a mixture with hydrogen and oxygen.

The comminution of substances to flours (50-500 μm), powders (5-50 μm) and even greater fineness (less than 5 μm) is common practice in the art. For all comminution tasks, a multitude of technical equipment is supplied and operated, which is matched to the peculiarities of the individual tasks. A good overview of the comminution problems and the various machines is given in Ullmanns Enzyklopädie der technischen Chemie, 3rd edition, volume 1, page 616 to page 638.

In fumed silica, the mean primary particle diameters are considerably lower (5-50 nm) than can be obtained by a mechanical comminution. The primary particles and aggregates of fumed silica with a surface area of 200 $m^2/g$ can be visualized in an electron microscope.

The primary particles and aggregates of a fumed silica combine to form larger composites, the agglomerates. In general, the smaller the particle size is or the greater the specific surface area is, and the more highly compacted the fumed silica is, the larger these agglomerates are.

The binding forces with which these agglomerates are held together are relatively weak. Nevertheless, in the incorporation and dissolution of these agglomerates in a liquid system for the purpose of homogeneous distribution of the primary particles and aggregates or low-agglomeration particles, a certain expenditure of shear energy is required. For the dispersion, according to the field of use, a wide variety of different mixing units is used, the crucial factors for the selection being both the viscosity and polarity of the system and the agglomerate strength and the desired homogeneity.

With simple stir systems, for example paddle stirrers, direct incorporation of small amounts of silicas usually cannot be carried out satisfactorily, particularly when low-viscosity systems are involved. However, manufacturers of coatings and paints, and also processors, have an interest in achieving an optimal distribution from a performance point of view of the silicas which are used predominantly as thickeners and thixotropic agents with very simple equipment and with a minimum level of time consumption and energy expenditure.

In the case of paddle stirrer dispersion, the coarse silica agglomerates are not comminuted sufficiently and can thus make only a small contribution to raising viscosities and thixotropy. The information is based on a UP resin (unsaturated polyester resin) as a dispersant.

A reduction of the agglomerate size by dispersing outside a liquid system, i.e., in practical terms, under air or by grinding in the conventional sense, was possible in the prior art only to a limited degree, since, in the case of a given agglomeration tendency of the material, the old agglomeration state is soon re-established after the comminution. This effect occurs no later than after recompaction of the material, which has been greatly loosened by the mechanical intervention and cannot be shipped or stored in this form. The storage time would also have an effect, in the sense of agglomerate reenlargement.

The mass number and evaluation parameter employed for the state of distribution of a dispersible silica and maximum agglomerate size of the dispersion (granularity) is the so-called grindometer value to DIN 53203.

It is known that fumed silica can be hydrophobized, ground in a pin mill and then classified (US 2004/0110077 A1). This known silica is used as an external additive in toner mixtures.

Hydrophilic fumed silica with a BET surface area of 200 $m^2/g$ has a grindometer value, determined in UP resin (Ludopal P6 unsaturated polyester resin from BASF, 2% dispersion) by the DIN method, of 50 to 60 μm.

When this fumed silica is additionally more highly compacted (100 to 120 g/l), the grindometer value is also significantly higher, specifically more than 100 μm, as a result of which an additional, not inconsiderable expenditure of energy is required as a thickener and thixotropic agent.

It is known that a high-dispersity silica with a surface area of approx. 300 $m^2/g$ can be ground in a pin mill.

The grindometer value achieved is initially 25 μm for the uncompacted silica.

If this silica is compacted to 50 g/l, the grindometer value rises to 30 μm, and, in the event of further compaction to 75 g/l, even to about 40 μm.

In the course of storage over a period of three months, the ground, unmodified silica compacted to 50 g/l has a grindometer value of 50 to 60 μm.

According to the prior art, reagglomeration can be prevented only if the hydrophilic silica is mixed with 3% by weight of a hydrophobic silica and this mixture is ground by means of an air-jet mill or of a pin mill (EP 0 076 377 B1).

For a fumed silica with a BET surface area of 200 $m^2/g$, even after compaction to 73 or 107 g/l, a grindometer value of 35 μm is attained.

In the case of a fumed silica with a BET surface area of 300 $m^2/g$, as a result of the addition of hydrophobic silica before the grinding, the grindometer value of 10 μm at a tamped density of 28 g/l and of 15 to 20 μm at a tamped density of 50 g/l is achieved.

The known fumed silicas have the disadvantage that they still have relatively high grindometer values and hence their contribution to increasing the viscosities and thixotropy is not optimal, and that the values worsen in the course of prolonged storage.

The technical object was therefore to provide fumed silanized silicas which have improved rheological properties and simultaneously low grindometer values.

The technical object is achieved by a hydrophobic fumed silica which is obtained by grinding a fumed silica which, as a result of silanization, has octylsilyl groups fixed on the surface.

Preferably, the grinding is effected with a pin mill or an air-jet mill. This affords silicas which have a lower grindometer value than the unground starting material used, i.e. the unground silicas. The ground silica of the invention is therefore better and more rapidly dispersible, for example, in coating formulations.

Moreover, it is preferred that the resulting silica, in coating formulations, brings about a haze value of less than 16, preferably of 15 or less (measured at an angle of incidence of 20°).

In a preferred embodiment, the silica of the invention has a tamped density of 10 to 100 g/l, preferably of 15 to 65 g/l.

Fumed silicas are known from Winnacker-Küchler Chemische Technologie [Chemical Technology], volume 3 (1983), 4th edition, page 77, and Ullmanns Enzyklopädie der technischen Chemie, 4th edition (1982), volume 21, page 462.

In particular, fumed silicas are prepared by flame hydrolysis of evaporable silicon compounds, for example $SiCl_4$, or organic silicon compounds, such as trichloromethylsilane, in a hydrogen-oxygen gas flame.

The silicas in the context of the present invention are fumed silicas, the surface having been modified with at least one organic component. They are therefore referred to as surface-modified silicas. Modified fumed silicas (silicas prepared from fumed silicas) are understood to means silicas which can be prepared on the basis of fumed silicas according to DE 24 14 478. Surface modification is understood to mean the chemical and/or physical attachment of organic components to the surface of the silica particles. In other words, in the case of surface-modified silicas, at least part of the surface of at least some of the silica particles is covered with the surface modifiers. In the present case, the fumed silicas are silanized by reacting fumed silica with trimethoxyoctylsilane or triethoxyoctyl-silane in a known manner, the octylsilyl groups being fixed on the surface of the fumed silica.

The silica of the invention does not tend to reagglomerate. The grindometer value of the silica of the invention is lower than that of the starting material and, in the case of a dispersion time of 30 min, is below 12 µm, usually even below 10 µm, while the grindometer value of the unground silica is 12 µm. In the case of a dispersion time of 60 min, the grindometer value of the silica of the invention is always below 10 µm.

In a further preferred embodiment, the silica of the invention has a specific BET surface area of 100 to 250 $m^2/g$, preferably of 120 to 200 $m^2/g$, more preferably of 130 to 170 $m^2/g$.

It is also preferred that the silica of the invention has a mean particle size according to Cilas of 5.0 to 20.0 µm. In a further preferred embodiment, the silica according to the present invention has a pH in the range of 5.0 to 6.0.

The invention further provides a process for producing the silica of the invention, the process being characterized by the step of grinding a fumed silica which, as a result of silanization, has octylsilyl groups fixed on the surface.

In a preferred process, the silica used has a BET surface area of 100 to 250 $m^2/g$, preferably of 100 to 200 $m^2/g$, more preferably of 120 to 180 $m^2/g$, and a tamped density of 10 to 100 g/l, preferably of 15 to 65 g/l and more preferably of approx. 50 to 60 g/l.

In a further preferred embodiment of the preparation process according to the present invention, the silicas used have the following physicochemical characteristic data:

| | |
|---|---|
| BET surface area $m^2/g$: | 125-175 |
| Mean size of the primary particles nm: | 12 |
| pH: | 3.5-5.5 |
| carbon content % by weight: | 1.0 to 10, preferably 5.0 to 7.0 |

In a further preferred preparation process, the silicas used also have the following physicochemical characteristic data:

| Tamped density[2] g/l | Approx. 60 |
|---|---|
| Drying loss[3] (2 h at 105° C.) % by weight on departure from the manufacturer | <=0.5 |
| Ignition loss[4][5] (2 h at 1000° C.) % by weight | 5.0-7.0 |
| pH[6][7] | 3.5-5.5 |
| SiO$_2$ content[8] % by weight | >=99.8 |
| Al$_2$O$_3$ content[8] % by weight | <=0.05 |
| Fe$_2$O$_3$ content[8] % by weight | <=0.01 |
| TiO$_2$ content[8] % by weight | <=0.03 |
| HCl content[8][9] % by weight | <=0.025 |

[1] To DIN ISO 9277
[2] To DIN EN ISO 787-11, JIS K 5101/20 (unscreened)
[3] To DIN EN ISO 787-2, ASTM D 280, JIS K 5101/23
[4] To DIN EN 3262-20, ASTM D 1208, JIS K 5101/24
[5] Based on the substance dried at 105° C. for 2 hours
[6] To DIN EN ISO 787-9, ASTM D 1208, JIS K 5101/26
[7] Water:methanol = 1:1
[8] Based on the substance calcined at 1000° C. for 2 hours
[9] HCl content is part of the ignition loss The silicas of the invention are used, among other uses, as thickeners or thixotropic agents in coating formulations.

The present invention therefore also provides coating formulations comprising a hydrophobic fumed silica which is obtained by grinding a fumed silica which, as a result of silanization, has octylsilyl groups fixed on the surface. The ground silica present in the coating formulation has a lower grindometer value than the unground silica and is thus better and more rapidly dispersible.

In a preferred embodiment, the coating formulation (as a coating) has a haze value of less than 16, preferably of 15 or less (measured with a reflectometer at an angle of incidence of 20°.

In a preferred embodiment, the tamped density of the silica is 10 to 100 g/l, preferably 15 to 65 g/l.

Coating formulations in the context of the present invention are coating formulations comprising at least one polymer component and/or a mixture of a plurality of physically or chemically crosslinking polymer components, at least one solvent and at least one surface-modified silica. The coating formulations of the invention are preferably 1-component coatings, 2-component coatings and UV coatings, especially polyurethane coatings, and most preferably clearcoats and matt coating formulations.

A clearcoat in the sense of the invention is a coating material which, applied on a substrate, forms a transparent coating with protective, decorative or specifically technical properties. In a coating system, the clearcoat protects, as the uppermost layer, the layers below it from mechanical damage and weathering influences. A clearcoat does not comprise any pigments. Especially in the case of clearcoats, the transparency of the coating, i.e. the visual impression of how clear and undistorted the surface of the material coated with the clearcoat can be seen through the coating after it has dried, is a measure of the quality of the coating. When the clearcoat is applied on a shiny black background, the blackness value $M_y$ can be employed as a measure for the transparency of this coating.

In a preferred embodiment, the coating formulation (as a coating) has a blackness value $M_y$ of at least 280, preferably of at least 285.

It is also preferred that the coating formulation comprises 0.5 to 15% by weight of the silica.

In addition to the components mentioned, the coating formulations of the invention may also comprise further assistants and additives typically used in coatings, for example plasticizers, stabilizers, phase mediators, pigments, surfactants, desiccants, catalysts, initiators, photosensitizers, inhibitors, light stabilizers and preservatives.

The coating formulations of the invention may, as binders, comprise the resins customary in coatings technology, as described, for example, in "Lackharze, Chemie, Eigenschaften and Anwendungen [Coating Resins, Chemistry, Properties and Applications], Eds. D. Stoye, W. Freitag, Hanser Verlag, Munich, Vienna 1996". The contents of this publication are hereby incorporated explicitly into the content of the description of the present invention. Examples include the polymers and copolymers of (meth)acrylic acid and their esters, which optionally bear further functional groups, with further olefinically unsaturated compounds, for example styrene; polyetherpolyols, polyesterpolyols, polycarbonatepolyols, polyurethanepolyols and epoxy resins, and any desired mixtures of these polymers, and also fatty acid-modified "alkyd resins" prepared by polycondensation, as described in Ullmann, 3rd edition, volume 11, page 334 ff. The contents of this publication are hereby incorporated explicitly into the content of the description of the present invention.

Preference is given to using, as polymer components, organic compounds bearing hydroxyl groups, for example polyacrylatepolyols, polyesterpolyols, poly-caprolactonepolyols, polyetherpolyols, polycarbonate-polyols, polyurethanepolyols and hydroxy-functional epoxy resins, and any mixtures of these polymers. The particularly preferred polymeric organic compounds used are aqueous or solvent-containing or solvent-free polyacrylatepolyols and polyesterpolyols and any mixtures thereof.

Suitable polyacrylatepolyols are copolymers of, inter alia, monomers having hydroxyl groups with other olefinically unsaturated monomers, for example esters of (meth)acrylic acid, styrene, [alpha]-methylstyrene, vinyltoluene, vinyl esters, maleic and fumaric mono- and dialkyl esters, [alpha]-olefins and further unsaturated oligomers and polymers.

In a further preferred embodiment, the coating formulation comprises 5.0 to 99.5% by weight of solids of a polymer component or of a mixture of two or more physically or chemically crosslinking polymer components and/or 0 to 99.5% by weight of a low molecular weight component which functions as a solvent or of a mixture of such low molecular weight components.

It is also preferred that the coating formulation comprises at least one binder selected from the group consisting of polymers and copolymers of (meth)acrylic acid and esters thereof, which optionally bear further functional groups, with further olefinically unsaturated compounds, for example styrene; polyetherpolyols, polyesterpolyols, polycarbonatepolyols, polyurethanepolyols, epoxy resins, and fatty acid-modified alkyd resins prepared by polycondensation.

The silica of the invention does not tend to reagglomerate. The grindometer value is below 12 µm, preferably below 10 µm.

The present invention is illustrated with reference to the examples which follow, which do not, however, restrict the scope of protection.

EXAMPLES

1. Grinding

To prepare the inventive examples, commercial AEROSIL® R805 (sack goods) were metered into the mill used with a metering balance and ground.

AEROSIL® R805 is an octylsilane-aftertreated AEROSIL 200 fumed silica.

The physicochemical characteristic data of the silica used (here AEROSIL® R805) are listed in Table 1.

TABLE 1

| Fumed silica used | |
|---|---|
| | AEROSIL ® R805 |
| Behaviour towards water | Hydrophobic |
| Appearance | White powder |
| BET surface area[1]) m$^2$/g | 125-175 |
| Mean size of the primary particles nm | 12 |
| Tamped density[2]) g/l | Approx. 60 |
| Drying loss[3]) (2 h at 105° C.) % by weight on departure from the manufacturer | <=0.5 |
| Ignition loss[4)5]) (2 h at 1000° C.) % by weight | 5.0-7.0 |
| Carbon content % by weight | 6.0-7.0 |
| pH[6)7]) | 3.5-5.5 |
| SiO$_2$ content[8]) % by weight | >=99.8 |
| Al$_2$O$_3$ content[8]) % by weight | <=0.05 |
| Fe$_2$O$_3$ content[8]) % by weight | <=0.01 |
| TiO$_2$ content[8]) % by weight | <=0.03 |
| HCl content[8)9]) % by weight | <=0.025 |

[1]) To DIN ISO 9277
[2]) To DIN EN ISO 787-11, JIS K 5101/20 (unscreened)
[3]) To DIN EN ISO 787-2, ASTM D 280, JIS K 5101/23
[4]) To DIN EN 3262-20, ASTM D 1208, JIS K 5101/24
[5]) Based on the substance dried at 105° C. for 2 hours
[6]) To DIN EN ISO 787-9, ASTM D 1208, JIS K 5101/26
[7]) Water:methanol = 1:1
[8]) Based on the substance calcined at 1000° C. for 2 hours
[9]) HCl content is part of the ignition loss For the tests, a pin mill (Alpine 160Z, rotor diameter 160 mm) or an air-jet mill (grinding space diameter: 240 mm, grinding space height: 35 mm) was used. The ground product was isolated with a bag filter (filter area: 3.6 m$^2$, filter material: nylon fabric). In further tests, the resulting ground product was packed into commercial sacks with a commercial bagging machine. In further tests, the sacks packed with ground product were leveled with a technically customary method suitable for this purpose before palleting. The leveled sacks were, as is commercially customary, palleted and subsequently stored over five weeks. The parameters of the production process are listed in Table 2.

TABLE 2

| | | The table shows the parameters of the production of some examples of the silicas of the invention | | | | | | | |
|---|---|---|---|---|---|---|---|---|---|
| Example | Mill* | GA** rate [m$^3$] | GA** pressure [bar] | IA*** rate [m$^3$] | IA*** pressure [bar] | Metering [kg/h] | Bagging | Levelling | Storage |
| 1 | AJ | 27.5 | 3.5 | 15.9 | 3.7 | 10 | No | No | No |
| 2 | AJ | 27.5 | 3.5 | 15.9 | 3.7 | 10 | Yes | No | No |
| 3 | AJ | 27.5 | 3.5 | 15.9 | 3.7 | 10 | Yes | Yes | No |
| 4 | AJ | 27.5 | 3.5 | 15.9 | 3.7 | 10 | Yes | Yes | Yes |
| 5 | AJ | 11.5 | 1.0 | 6.8 | 1.2 | 10 | No | No | No |

TABLE 2-continued

The table shows the parameters of the production
of some examples of the silicas of the invention

| Example | Mill* | GA** rate [m³] | GA** pressure [bar] | IA*** rate [m³] | IA*** pressure [bar] | Metering [kg/h] | Bagging | Levelling | Storage |
|---|---|---|---|---|---|---|---|---|---|
| 6 | AJ | 11.5 | 1.0 | 6.8 | 1.2 | 10 | Yes | No | No |
| 7 | AJ | 11.5 | 1.0 | 6.8 | 1.2 | 10 | Yes | Yes | No |
| 8 | AJ | 11.5 | 1.0 | 6.8 | 1.2 | 10 | Yes | Yes | Yes |
| 9 | PM | — | — | — | — | 10 | No | No | No |
| 10 | PM | — | — | — | — | 10 | Yes | No | No |
| 11 | PM | — | — | — | — | 10 | Yes | Yes | No |
| 12 | PM | — | — | — | — | 10 | Yes | Yes | Yes |

*AJ = air-jet mill; PM = pin mill,
GA** = grinding air;
IA*** = injector air

2. Determination of the Physicochemical Characteristic Data of the Ground Silicas 2.1 BET Surface Area The BET surface area is determined to DIN ISO 9277.

2.2 Tamped Density

The tamped density was determined to DIN EN ISO 787-11. A defined amount of a sample which had not been screened beforehand is filled into a graduated glass cylinder and subjected to a fixed number of tamping operations by means of a tamping volumeter. During the tamping, the sample is compacted. As a result of the analysis carried out, the tamped density is obtained.

Fundamentals of the tamped density determination: The tamped density (formerly tamped volume) is equal to the quotient of the mass and the volume of a powder after tamping in a tamping volumeter under fixed conditions. According to DIN ISO 787/XI, the tamped density is reported in $g/cm^3$. Owing to the very low tamped density of the oxides, however, the value is reported here in g/l. In addition, the drying and screening and the repetition of the tamping operation are dispensed with.

Equipment for Tamped Density Determination:
tamping volumeter
measuring cylinder
laboratory balance (readability 0.01 g)

Performance of the Tamped Density Determination:
200±10 ml of oxide are filled into the measuring cylinder of the tamping volumeter such that no cavities remain and the surface is horizontal. The mass of the sample introduced is determined accurately to 0.01 g. The measuring cylinder with the sample is placed into the measuring cylinder holder of the tamping volumeter and tamped 1250 times. The volume of the tamped oxide is read off accurately to 1 ml.

Evaluation of the Tamped Density Determination:

$$\text{tamped density (g/l)} = \frac{\text{Initial weight in g} \times 1000}{\text{Volume read off in ml}}$$

2.3 pH

Reagents for pH Determination:
distilled or demineralized water, pH >5.5
methanol, p.a.
buffer solutions pH 7.00, pH 4.66

Equipment for pH Determination:
laboratory balance (accuracy 0.1 g)
beaker, 250 ml
magnetic stirrer
stirrer bar, length 4 cm
combined pH electrode
pH measuring instrument
Dispensette, 100 ml Procedure for Determining the pH:
the determination was effected to DIN EN ISO 787-9.

Calibration: before the pH measurement, the measuring instrument is calibrated with the buffer solutions. When a plurality of measurements are carried out in succession, a single calibration is sufficient.

4 g of oxide are converted to a paste with 48 g (61 ml) of methanol in a 250 ml beaker, and the suspension is diluted with 48 g (48 ml) of water and stirred with a magnetic stirrer in the presence of an immersed pH electrode (rotational speed approx. 1000 $min^{-1}$).

After the stirrer has been switched off, the pH is read off after a wait time of one minute. The result is displayed with one decimal place.

Table 3 summarizes the physicochemical data of the silicas of the invention and of the comparative example.

TABLE 3

Physicochemical data of the silicas of the invention

| Designation | Specific BET surface area [m²/g] | pH | Tamped density [g/l] | Median [nm] (Cilas) |
|---|---|---|---|---|
| Comparative example | 155 | 5.3 | 59 | 40.5 |
| Example 1 | 155 | 5.3 | 15 | 17.1 |
| Example 2 | 154 | 5.3 | 35 | 5.4 |
| Example 3 | — | 5.3 | 43 | 5.4 |
| Example 4 | — | 5.3 | 56 | 5.1 |
| Example 5 | 155 | 5.7 | 17 | 18.9 |
| Example 6 | 157 | 5.4 | 28 | 12.0 |
| Example 7 | — | 5.3 | 37 | 14.2 |
| Example 8 | — | 5.3 | 55 | 17.1 |
| Example 9 | 157 | 5.3 | 17 | 7.4 |
| Example 10 | 154 | 5.2 | 37 | 6.0 |
| Example 11 | — | 5.6 | 42 | 6.9 |
| Example 12 | — | 5.5 | 50 | 6.5 |

3. Performance Tests 3.1 Test Procedure

The patterns described in the examples were performance-tested in a 2K PU clearcoat based on acrylate/isocyanate in comparison to unground starting material. The raw materials used were as follows:

Macrynal SM 510n CH: 130010625 (Surface Specialties), Desmodur N 75 MPA (Bayer)

Table 4 shows the formulation of the 2K PU clearcoat comprising the ground silicas of the invention

TABLE 4

Formulation of the 2K PU clearcoat

|  | Parts by wt. |
|---|---|
| Millbase | |
| Macrynal SM 510n 60 LG | 23.34 |
| Butyl acetate 98% | 8.48 |
| AEROSIL ® | 0.70 |
| Letdown | |
| Millbase | 32.52 |
| Macrynal SM 510n 60 LG | 33.54 |
| Xylene | 3.92 |
| Ethoxypropyl acetate | 3.46 |
| Butylglycol acetate | 1.50 |
| Butyl acetate 98% | 3.93 |
| Curing agent | |
| Desmodur N 75, 75% strength | 21.33 |
| Σ | 100.00 |

The solids content of the coating formulation was 50%. The acrylate-polyol:isocyanate solids ratio was 68:32. The concentration of Aerosil® based on the solids content was 1.4%, and the Aerosil® concentration in the coating 0.7%.

Table 5 shows the steps for producing and testing the 2K PU clearcoat.

TABLE 5

Manufacture and testing of the 2K PU clearcoat

| Predispersion | disperse 2.5 times the amount of millbase with a dissolver at 2500 rpm for 5 min |
|---|---|
| Dispersion | 60 min in a Skandex disperser 250 ml glass bottles with addition of 200 g of glass beads, grindometer value determination after 30 and 60 min |
| Letdown | With an initial charge of the millbase, the letdown mixture (Macrynal with the remaining components) is added. The homogenization is effected with a paddle stirrer. |
| Addition of the curing agent | the curing agent Desmodur N 75 is added with stirring (1000 rpm). Subsequently, the mixture is homogenized for 1 min. |
| Viscosity determination | Physica MCR 300 rotary viscometer: establishment of flow curves of the millbase 24 h after production $\gamma = 50\ s^{-1}$ (30 s) Rest (600 s) $\gamma = 0.01\ s^{-1}$ to 1 $s^{-1}$ (528.6 s) $\gamma = 1\ s^{-1}$ to 500 $s^{-1}$ (50 s) the establishment of flow curves and yield curves of the coating 15 min after addition of the curing agent: Flow curve: $\gamma = 50\ s^{-1}$ (30 s) Rest (600 s) $\gamma = 0.1\ s^{-1}$ to 500 $s^{-1}$ (150 s) Yield curve: 120 s at $\gamma = 500\ s^{-1}$ 300 s at $\gamma = 0.5\ s^{-1}$ |
| Application | spray application at 21 s DIN 4 mm on to metal sheets painted black (DT36) with a spraying machine Setting: 1 crosscoat at setting 3.8; dry layer thickness: approx. 34-42 µm Spray dilution: Xylene 50 Ethoxypropyl acetate 6 Butylglycol acetate 6 Butyl acetate 98% 38 |
| Drying conditions | approx. 24 h at RT, then at 70° C. for 2 h |
| 20° reflectometer value, haze | the shine and the cloudiness are assessed on coating films which have been applied to black metal sheets with a reflectometer from Byk Gardner |
| Blackness value $M_y$ (assessment of transparency) | the blackness value is determined on coating films which have been applied to metal sheets painted black, with a D19C densitometer from Gretag Macbeth. The blackness value $M_y$ is obtained by multiplying the value measured by one hundred |
| Wave scan (profile) | the profile is assessed by means of a wave-scan plus system from Byk-Gardner |

3.2 Grindometer Value 3.2.1 Basics

The degree of dispersion determines the performance properties of the Aerosil-thickened liquid. The measurement of the grindometer value serves for assessment of the degree of dispersion. The grindometer value is understood to mean the interface layer thickness below which the spots or aggregates present become visible on the surface of the exposed sample.

The sample is exposed with a scraper in a groove whose depth at one end is twice as great as the diameter of the largest Aerosil grains and decreases constantly to 0 at the other end. On a scale which specifies the depth of the groove, the value of the depth in micrometers below which a relatively large number of Aerosil grains become visible as a result of spots or scratches on the surface of the binder system is read off. The value read off is the grindometer value of the present system.

3.2.2. Performance of the Grindometer Value Determination

The grindometer block is placed onto a flat, slip-resistant surface and wiped clean immediately before the test. The Aerosil dispersion, which must be free of air bubbles, is then applied at the lowest point in the groove such that it flows away a little above the edge of the groove. The scraper is then gripped with both hands and placed onto the end of the groove in which the dispersion is present perpendicularly to the grindometer block and at right angles to its longitudinal edges with gentle pressure. The dispersion is then exposed by slow, homogenous pulling of the scraper over the block in the groove. No later than 3 seconds after the exposure of the dispersion, the grindometer value is read off.

In the determination, the surface of the exposed dispersion (at right angles to the groove) is viewed obliquely from above at an angle of 20-30° (to the surface). The block is held to the light such that the surface structure of the exposed dispersion is readily discernible.

On the scale, the grindometer value read off is the value in micrometers below which a relatively large number of Aerosil grains become visible as spots or scratches on the surface. Individual spots or scratches which appear coincidentally are not taken into account.

The granularity is assessed at least twice, and in each case on a newly exposed dispersion.

3.2.3 Evaluation

The measurements are used to form the arithmetic means. There exists the following relationship between the grindometer value in micrometers and the Hegmann units and FSTP units based on the target system:

$$B = 8 - 0.079A$$

$$C = 10 - 0.098A = 1.25B$$

In the equations:
A=grindometer value in micrometers
B=grindometer value in Hegmann units
C=grindometer value in FSTP units

3.3 Optical Properties

3.3.1 Determination of the Transparency as the Blackness Value $M_y$.

The blackness value $M_y$ is determined on coating films which have been applied to metal sheets sprayed with black paint, using a D19C densitometer from Gretag Macbeth. The value $M_y$ gives a statement about the colour depth and transparency of the clearcoat. The higher this value is, the more transparent is the coating. Simultaneously, the colour depth increases.

Table 6 shows the dispersibility of the silicas of the invention with reference to the grindometer values mentioned and summarizes the results of the optical properties of the 2K PU clearcoats comprising the silicas of the invention.

TABLE 6

Dispersibility and optical properties of the coatings comprising the silica of the invention

| | Grindometer value (μm) of the millbases | | Blackness | | Wave scan | | Flow time |
|---|---|---|---|---|---|---|---|
| | 30 min | 60 min | value $M_y$ | Haze | long | short | DIN 4 mm (s) |
| Starting material/ comparative example | 12 | <10 | 284 | 16 | 16 | 22 | 43 |
| Example 1 | <10 | — | 284 | 11 | 14 | 13 | 42 |
| Example 2 | <10 | — | 285 | 12 | 11 | 22 | 42 |
| Example 3 | <10 | — | 285 | 14 | 10 | 10 | 42 |
| Example 4 | <10 | — | 285 | 14 | 13 | 16 | 43 |
| Example 5 | 12 | <10 | 286 | 13 | 21 | 22 | 48 |
| Example 6 | 10 | <10 | 284 | 14 | 14 | 20 | 47 |
| Example 7 | 11 | <10 | 284 | 11 | 15 | 13 | 45 |
| Example 8 | 10 | <10 | 284 | 14 | 12 | 13 | 44 |
| Example 9 | 10 | <10 | 283 | 12 | 20 | 24 | 43 |
| Example 10 | <10 | — | 283 | 15 | 16 | 37 | 39 |
| Example 11 | <10 | — | 284 | 12 | 24 | 28 | 39 |
| Example 12 | 10 | <10 | 284 | 12 | 21 | 29 | 39 |

It is evident from Table 6 that the grindometer value of the silica of the invention is below 12 μm, while the unground silica has a grindometer value of 12 μm. The ground products thus exhibit an improved dispersibility compared to the starting material. For some samples, the grindometer value was below 10 μm, even after 30 minutes of dispersion time. It was therefore unnecessary to disperse it for a further 30 minutes. Surprisingly, the ground products, when they are bagged again, leveled and stored, i.e. were expected to have good comparability with the starting material, exhibited advantages in the haze value and in the flow properties, which is relevant, for example, for high-value automotive topcoats. As desired, further optical properties such as the blackness value or else the viscosity are not adversely affected by the grinding. The measurements which were carried out on the coating films comprising the silicas of the invention show that the quality criteria are satisfied with simultaneously improved dispersibility of the silicas in the coating formulations.

The invention claimed is:

1. A hydrophobic fumed silica, obtained by a process comprising grinding an unground fumed silica,
   wherein the unground fumed silica, as a result of silanization, comprises octylsilyl groups fixed on a surface,
   wherein the hydrophobic fumed silica has
   a lower grindometer value than the unground fumed silica,
   a specific BET surface area of 100 to 250 $m^2/g$,
   a tamped density of 10 to 100 g/L,
   a mean particle size according to Cilas of 5.0 to 20.0 μm, and
   in a coating formulation, a haze value of less than 16.

2. The silica of claim 1, wherein the grinding is effected with a pin mill or air-jet mill.

3. The silica of claim 1, wherein the silica has a pH in the range of 5.0 to 6.0.

4. A process for producing the fumed silica of claim 1, the process comprising:
   grinding an unground fumed silanized silica which, as a result of silanization, comprises octylsilyl groups fixed on a surface.

5. A coating formulation, comprising:
   the hydrophobic fumed silica of claim 1.

6. The formulation of claim 5, having a haze value of less than 16.

7. The formulation of claim 5, wherein the hydrophobic fumed silica has a lower grindometer value than the unground fumed silica.

8. The formulation of claim 5, wherein the hydrophobic fumed silica has a tamped density of 15 to 65 g/l.

9. The formulation of claim 5, having a blackness value $M_y$ of at least 280.

10. The formulation of claim 5, comprising 0.5 to 15% by weight of the hydrophobic fumed silica.

11. The formulation of claim 5, further comprising: 5.0 to 99.5% by weight of solids of a polymer component or of a mixture of two or more physically or chemically crosslinking polymer components;
    and/or
    up to 99.5% by weight of a low molecular weight component which functions as a solvent or of a mixture of such low molecular weight components.

12. The formulation of claim 5, further comprising
a binder comprising at least one selected from the group
consisting of
a polymer of (meth)acrylic acid,
a polymer of an ester(meth)acrylic acid,
a copolymer of (meth)acrylic acid with at least one further olefinically unsaturated compound, and
a copolymer of at least one ester(meth)acrylic acid with at least one further olefinically unsaturated compound.

13. The formulation of claim 5, wherein the binder comprises at least one selected from the group consisting of a polyetherpolyol, a polyesterpolyol, a polycarbonate-polyol, a polyurethanepolyol, a epoxy resin, and a fatty acid-modified alkyd resin.

14. The formulation of claim 12, wherein the copolymer is present and the at least one further olefinically unsaturated compound is styrene.

15. The silica of claim 1, wherein the tamped density is 15 to 100 g/L.

16. The silica of claim 1, wherein the tamped density is 15 to 65 g/L.

17. The silica of claim 1, wherein the tamped density is 60 to 100 g/L.

18. The silica of claim 1, wherein the tamped density is 10 to 50 g/L.

19. The silica of claim 1, wherein the tamped density is 50 to 65 g/L.

20. The formulation of claim 6, wherein the haze value is 15 or less.

21. The silica of claim 1, wherein the specific BET surface area is 120 to 200 $m^2/g$.

* * * * *